(12) United States Patent
Tanaka

(10) Patent No.: US 7,407,368 B2
(45) Date of Patent: Aug. 5, 2008

(54) TURBINE SHROUD SEGMENT

(75) Inventor: Agamu Tanaka, Nishitokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 773 days.

(21) Appl. No.: 10/743,058

(22) Filed: Dec. 23, 2003

(65) Prior Publication Data

US 2005/0004810 A1   Jan. 6, 2005

(30) Foreign Application Priority Data

Jul. 4, 2003   (JP) ............................... 2003-271198

(51) Int. Cl.
*F01D 11/08* (2006.01)
(52) U.S. Cl. .................................................. 415/173.1
(58) Field of Classification Search .............. 415/170.1, 415/173.1, 173.4, 173.5, 173.6, 174.4, 174.5, 415/189, 190
See application file for complete search history.

(56) References Cited

U.S. PATENT DOCUMENTS

| 5,188,506 | A |   | 2/1993 | Creevy et al. |   |
|---|---|---|---|---|---|
| 5,188,507 | A |   | 2/1993 | Sweeney |   |
| 5,333,995 | A | * | 8/1994 | Jacobs et al. | 415/209.2 |
| 6,164,656 | A |   | 12/2000 | Frost |   |
| 6,435,820 | B1 | * | 8/2002 | Overberg | 415/138 |

FOREIGN PATENT DOCUMENTS

| EP | 1 132 576 A2 | 9/2001 |
|---|---|---|
| JP | 11-62509 | 3/1999 |

* cited by examiner

*Primary Examiner*—Edward Look
*Assistant Examiner*—Nathaniel Wiehe
(74) *Attorney, Agent, or Firm*—Oblon, Spivak, McClelland, Maier & Neustadt, P.C.

(57) ABSTRACT

A shroud segment is incorporated in a gas turbine engine so as to suppress influence of hot combustion gas on a turbine case which has a groove and a hook for engagement with the shroud segment. The shroud segment is provided with a back plate formed in an arc shape, a front end of the back plate being supported by the groove so as to allow displacement in an axial direction of the gas turbine engine, a slot circumferentially formed on an outer surface of the back plate, the slot being engaged with the hook so as to be immovable in the axial direction and a touching member integrally formed on an inner surface of the back plate for touching with a rotating turbine blade. The slot is configured so as to satisfy an inequality of $v<t\leqq(v+0.1\ \text{mm})$, where v is a length of the hook and t is a width of the slot.

4 Claims, 5 Drawing Sheets

TURBINE SHROUD SEGMENT

BACKGROUND OF THE INVENTION

1. Field of the Invention

The present invention relates to a gas turbine engine for an aircraft and such and more particularly relates to a shroud segment of a turbine shroud for the gas turbine engine.

2. Description of the Related Art

A turbine of a gas turbine engine for an aircraft and such is provided with plural stages of turbine shrouds for suppressing influence of hot combustion gas on a turbine case. The turbine shrouds are directly exposed to the hot gas and thereby a severe thermal stress might be applied thereto. To avoid an excessive thermal stress, in common, each turbine shroud is segmented. Plural shroud segments are built up to form each turbine shroud.

Each shroud segment is provided with a back plate, as a main body thereof, formed in an arc shape. A front end of the back plate is movably fixed to the turbine case, where the front end is movable in a direction of an axis of the turbine. The rear end of the back plate is immovably fixed to the turbine case. Such a fixation manner allows thermal displacement of the back plate in the axis direction. An inner surface of the back plate is integrally provided with a touching member for touching with rotating turbine blades, which is formed in a honeycomb shape or the like.

The turbine case is provided with a rear case hook and a C-clip having a C-letter sectional shape supports the rear end of the back plate and the rear case hook in a manner that an outer surface of the rear end of the back plate is touched with the inner surface of the rear case hook. Thereby the rear end of the back plate is fixed to the turbine case and an axial clearance therebetween is sealed so that flow of the hot gas therethrough to the turbine case is suppressed.

The shroud segments and the turbine case are such that the turbine case is prevented from being influenced by the hot gas.

A related art is discloses in Japanese Patent Application Laid-open No. H11-62509.

SUMMARY OF THE INVENTION

In a case where the back plate of the shroud segment becomes less curved caused by a large thermal stress, the axial clearance between the rear end thereof and the turbine case is widened. This might lead to weakening sealing of the gap by the C-clip. The turbine case cannot be sufficiently prevented from being influenced by the hot gas. Meanwhile, the C-clip per se causes weight increase of the turbine engine.

The present invention is achieved in view of solving the above problem and intended for providing a shroud segment which effectively suppresses the influence by the hot gas on the turbine case without having C-clip.

According to a first aspect of the present invention, a shroud segment for being incorporated in a gas turbine engine so as to suppress influence of hot combustion gas on a turbine case, the turbine case having a groove and a hook for engagement with the shroud segment, is provided with a back plate formed in an arc shape, a front end of the back plate being supported by the groove so as to allow displacement in an axial direction of the gas turbine engine, a slot circumferentially formed on an outer surface of the back plate, the slot being engaged with the hook so as to be immovable in the axial direction and a touching member integrally formed on an inner surface of the back plate for touching with a rotating turbine blade. The slot is configured so as to satisfy an inequality of $v < t \leq (v+0.1 \text{ mm})$, where v is a length of the hook and t is a width of the slot.

Preferably, the shroud segment is further provided with an annular segment hook integrally formed on the front end of the back plate and projected axially forward, the segment hook being slidably engaged with the groove.

More preferably, the shroud segment is further provided with an annular flange projected axially forward from an arched flange extended radially inward from the front end of the back plate for supporting an outer band of a turbine nozzle disposed in front of and adjacent to the shroud segment.

Further preferably, the annular flange is configured so as to satisfy an inequality of $2k \leq s \leq 2.8k$, where k is a length of the annular segment hook and s is a length of the annular flange.

DETAILED DESCRIPTION OF THE PREFERRED EMBODIMENT

An embodiment of the present invention will be described hereinafter with reference to FIGS. 1 through 6. Throughout the specification, definition of directions such as front and rear is consistent with directions of elements in practical use. For example, a front end is illustrated on left hand in FIGS. 1 through 3 and 6. In and out are defined by near and far from an axis of a turbine engine.

Figure 6:
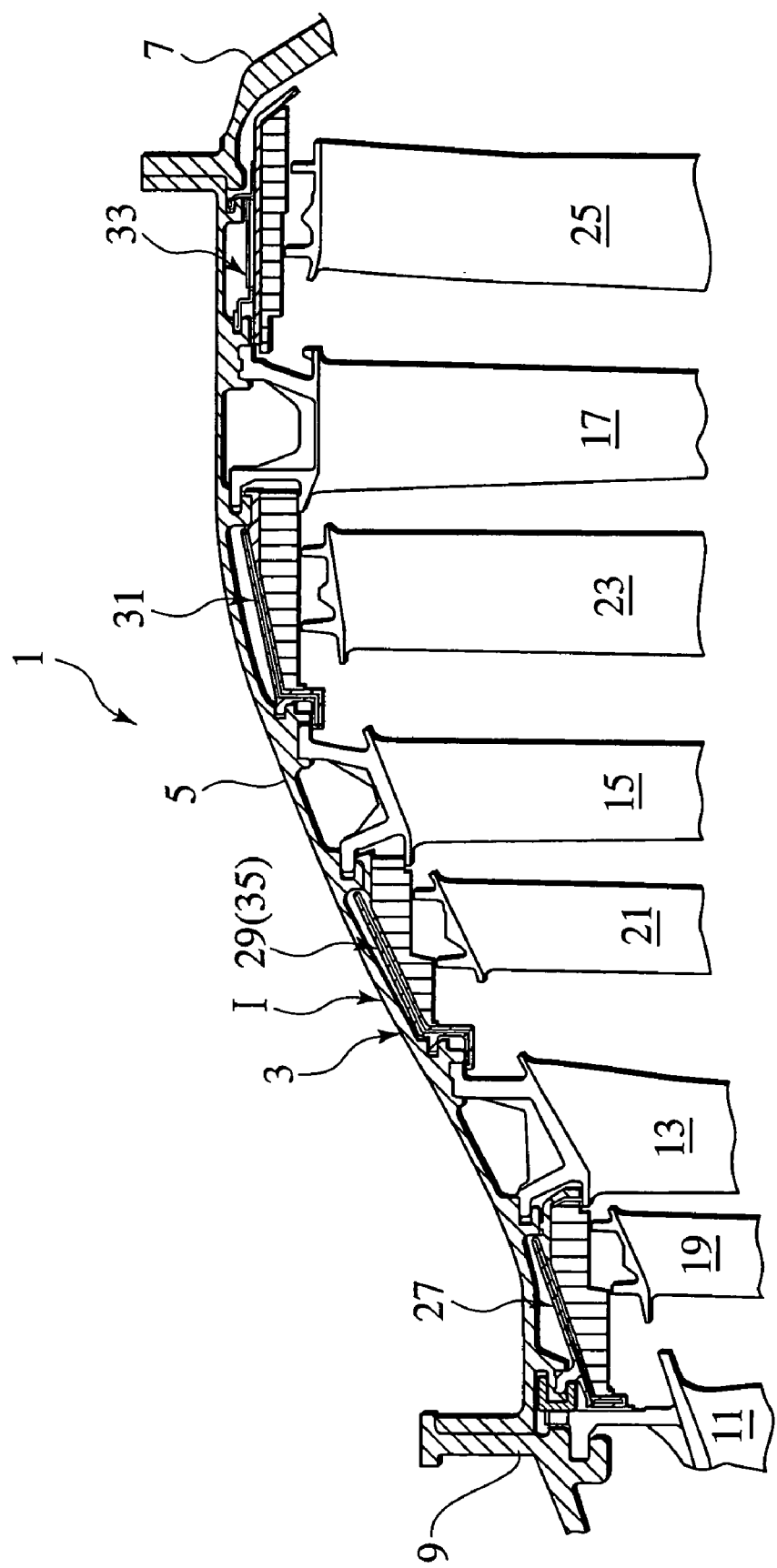
FIG. 6 is a sectional view of a low-pressure turbine for an aircraft, to which the shroud segment is installed.

Referring is now made to FIG. 6. A low-pressure turbine 1 of a turbine engine for an aircraft is provided with a turbine case 3. The turbine case 3 is provided with a main turbine case 5 and a rear turbine case 7 integrally connected with a rear end of the turbine case 5. A front end of the main turbine case 5 is connected with a high-pressure turbine case 9.

A plurality of turbine nozzles 13, 15 and 17 for rectifying the hot gas are fixed to and housed in the main turbine case 5. Each of the turbine nozzles 13, 15 and 17 is segmented to be plural nozzle segments which are butted end to end to form a complete ring. A plurality of turbine rotors are disposed alternately with the turbine nozzles 13, 15 and 17 and respectively provided with turbine blades 19, 21, 23 and 25. The turbine rotors unitedly rotate and are connected to a rotor of a low-pressure compressor (not shown) and a fan rotor of a fan (not shown). Turbine shrouds 27, 29, 31 and 33 are respectively disposed around the turbine rotors. Each of the turbine shrouds 27, 29, 31 and 33 is segmented to be plural shroud segments which are butted end to end to form a complete ring.

The hot gas having energy is supplied from a combustor (not shown) to the low-pressure turbine 1 so as to rotate the turbine rotors to which the low-pressure compressor and the fan are connected. Thereby the low-pressure turbine 1 extracts the energy from the hot gas and converts it to power to drive the low-pressure compressor and the fan.

Shroud segments 35 shown in FIGS. 1 through 5 are segmented from the second turbine shroud 29. Each shroud segment 35 is provided with a back plate 37 formed in an arc shape.

A segment hook 41 is integrally formed on a front end of the back plate 37 annularly and projecting forwardly. The segment hook 41 can be slidably fitted to a groove 39 formed on inner surface of the main turbine case 5. A clearance is formed between a front end of the segment hook 41 and a bottom of the groove 39 so as to allow thermal displacement of the back plate 37 in a cross direction. Thereby the front end of the back plate 37 is movably supported by the main turbine case 5.

Figure 1:
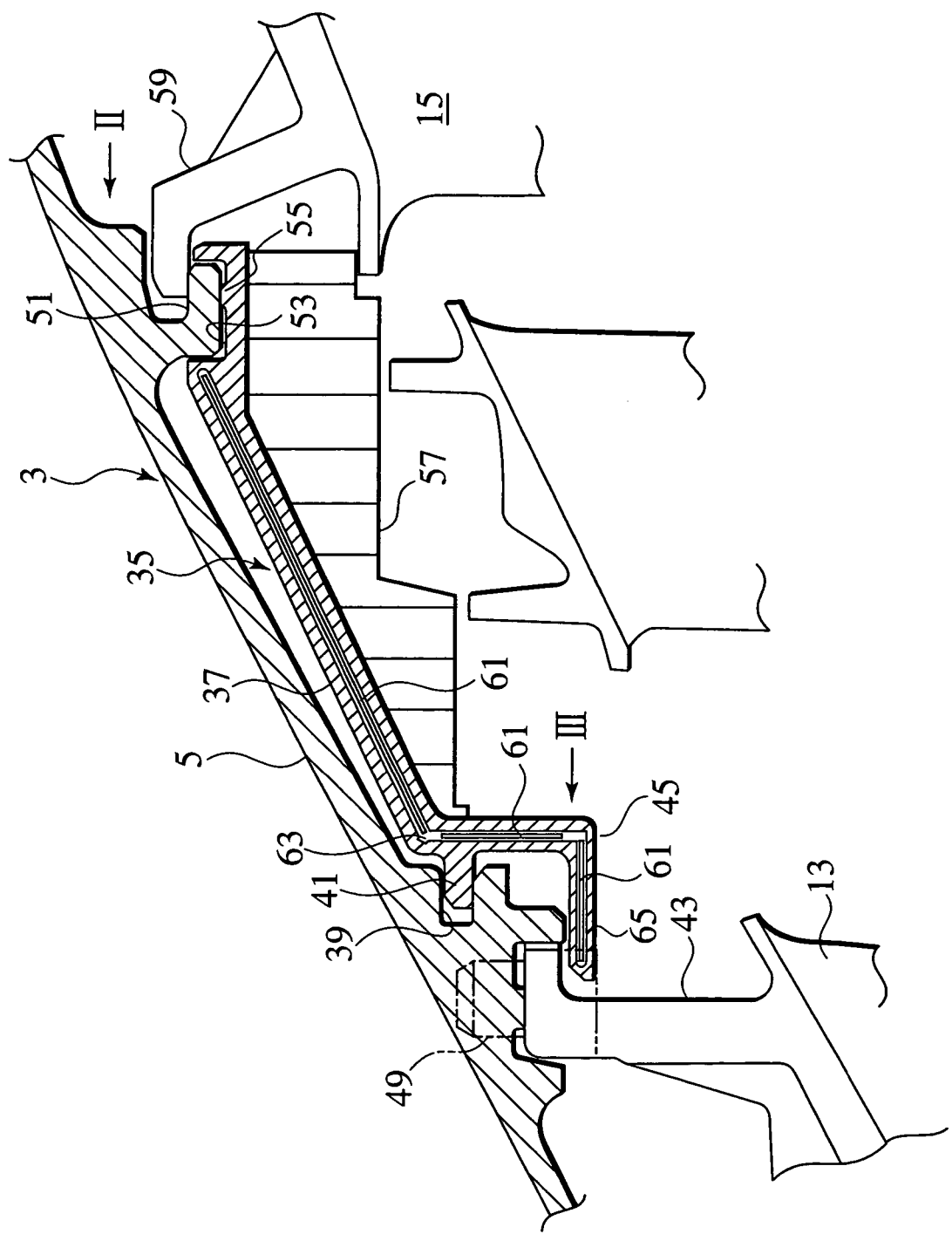
FIG. 1 is a sectional view of a shroud segment according to an embodiment of the present invention, taken from an arrow I of FIG. 6.
Figure 3:
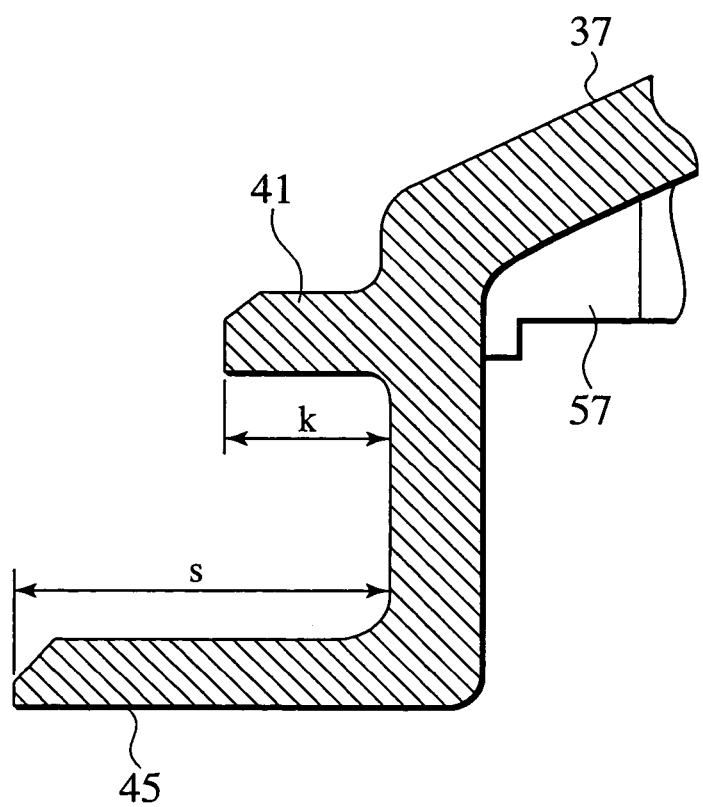
FIG. 3 is an enlarged view of the shroud segment around a front end thereof, taken from an arrow III of FIG. 1.

A segment flange 45 annularly formed is projected axially forward from an inner periphery of the arched flange, which is integrally extended radially inward (namely, toward an axis of the low-pressure turbine 1) from the front end of the back plate 37 as shown in FIGS. 1 and 3. The segment flange 45 is configured so as to support an outer band 43 of the turbine nozzle 13 disposed in front of and adjacent to the shroud segment 35. The segment flange 45 and the segment hook 41 are configured so as to satisfy a particular relation described below. To effectively suppress the hot gas flow, the segment flange 45 should be longer in a relation with the segment hook 41. Preferably an inequality of $2k \leq s$ should be satisfied, where k is a length of the segment hook 41 and s is a length of the segment flange 45 as shown in FIG. 3. To avoid providing an excessively long flange, the length s should be smaller. Preferably an inequality of $s \leq 2.8k$ should be satisfied. Therefore, the segment flange 45 and the segment hook 41 are configured so as to satisfy an inequality of $2k \leq s \leq 2.8k$.

Figure 4:
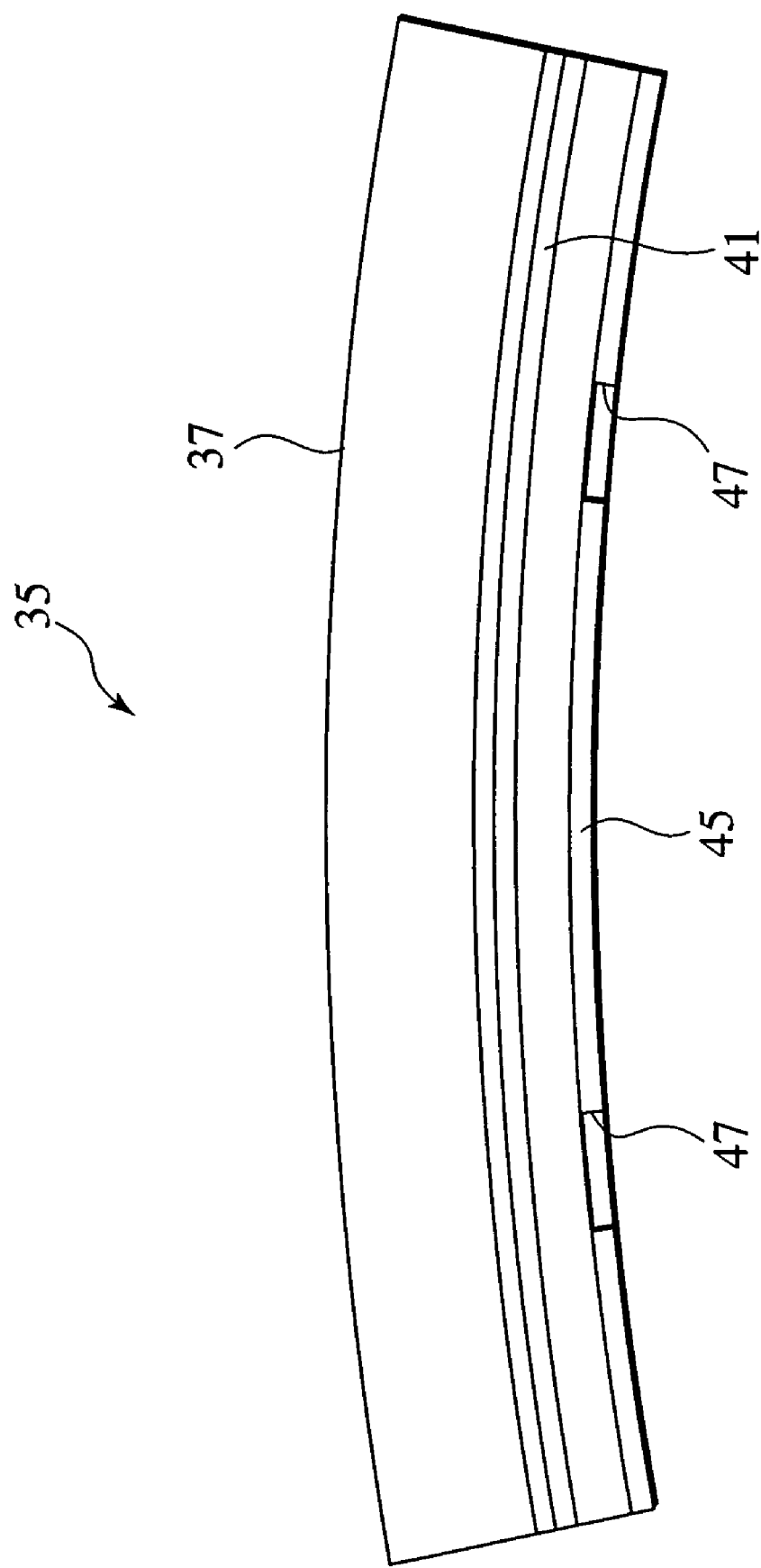
FIG. 4 is a front view of the shroud segment.
Figure 5:
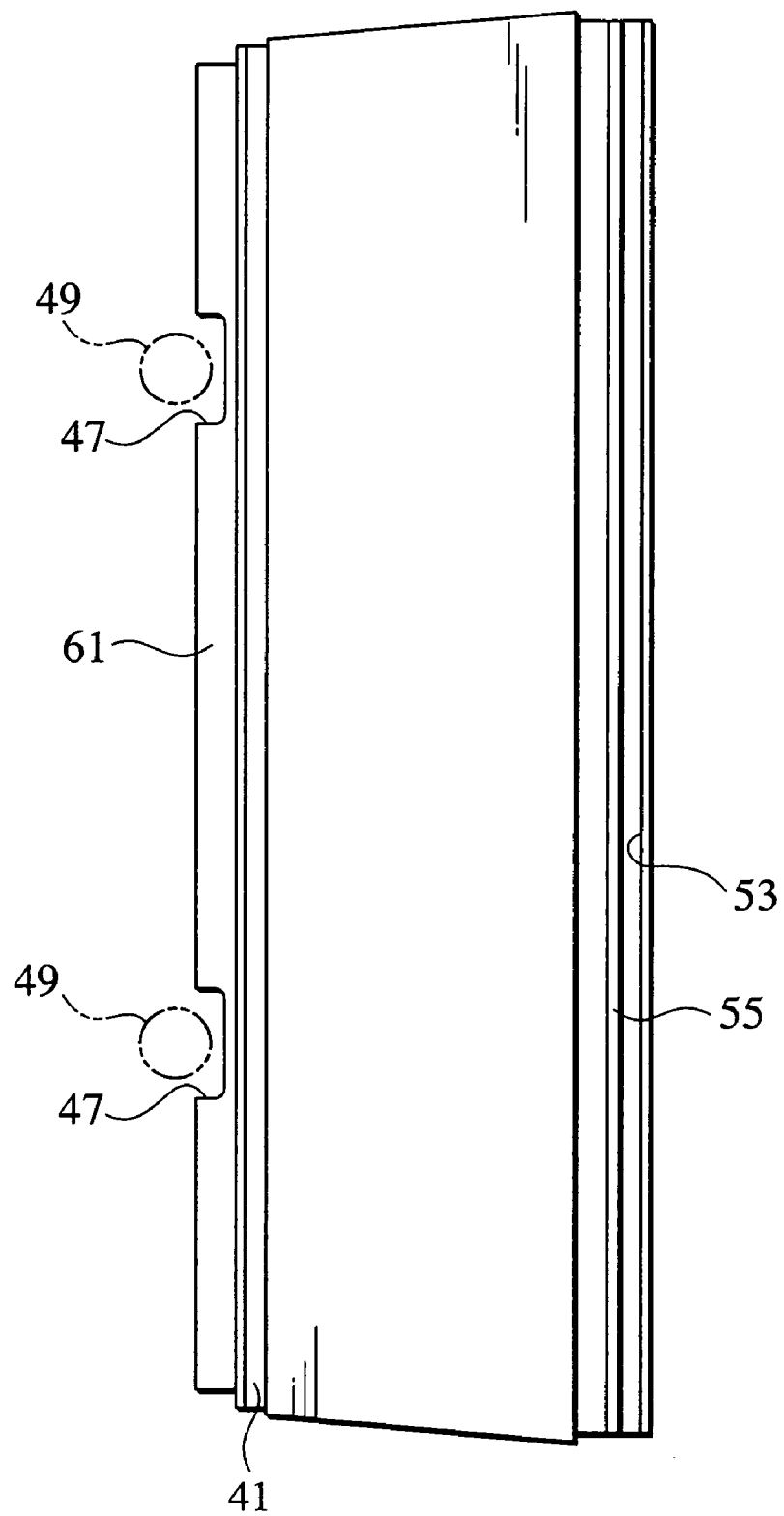
FIG. 5 is a plan view of the shroud segment.

The segment flange 45 is provided with recesses 47 as shown in FIGS. 4 and 5, with which pins 49 fixed to the main turbine case 5 are engaged so that relative rotation thereof is pinned.

Figure 2:
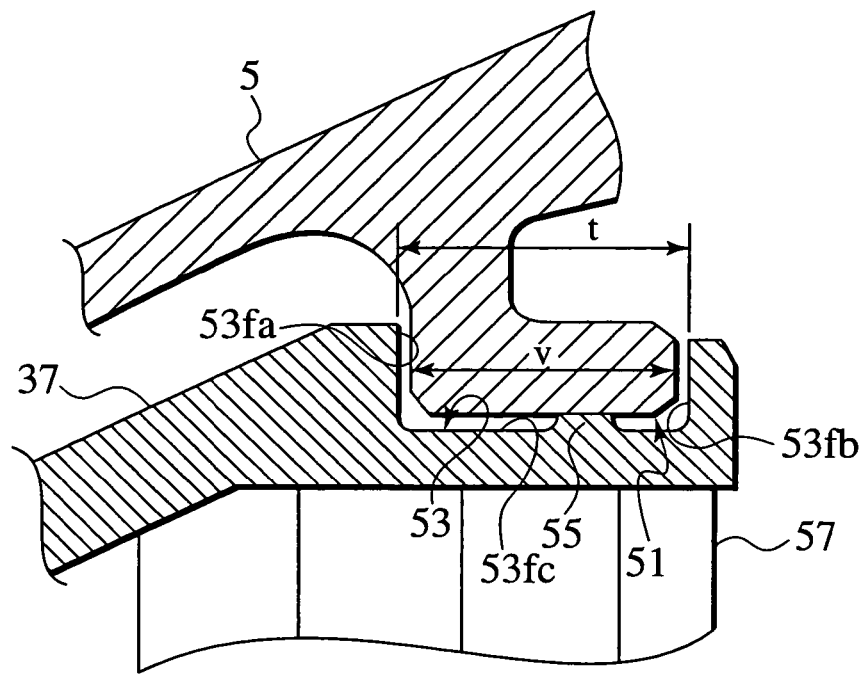
FIG. 2 is an enlarged view of the shroud segment around a rear end thereof, taken from an arrow II of FIG. 1.

At the rear end and on an outer surface of the back plate 37, a segment slot 53 is circumferentially formed so as to tightly link with a case hook 51 of the main turbine 5 as shown in FIGS. 1 and 2. The segment slot 53 is mainly composed of a first surface 53fa, which faces rearward, a second surface 53fb, which is opposed to the first surface 53fb, and a third surface 53fc, which faces outward. On the third surface 53fc, a rib 55 is circumferentially formed so as to slidably touch the case hook 51.

The segment slot 53 is so configured as to effectively seal axial clearances between the segment slot 53 and the case hook 51 even when the shroud segment 35 is thermally displaced in the axial direction. To gain such a function, the first surface 53fa and the second surface 53fb are machine-finished so as to satisfy an inequality of $v < t \leq (v+0.1 \text{ mm})$, where a length of the case hook 51 is v and a width of the segment slot 53 is t as shown in FIG. 2.

An inner surface of the back plate 37 is integrally provided with a honeycomb cell 57 for touching with tip fins 21a of rotating turbine blades 21. A rear end of the honeycomb cell 57 is slidably engaged with the turbine nozzle 15 disposed in rear of and adjacent thereto. The turbine nozzle 15 is provided with an outer band 59 slidably engaged with the case hook 51. Thereby the shroud segment 35 and the turbine nozzle 15 are cooperatively engaged with the case hook 51 so that the rear end of the back plate 37 is immovably supported by the case hook 51.

Both side surfaces of the back plate 37 are respectively provided with sealing slots 63. Similarly, both side surfaces of the segment flange 45 are respectively provided with sealing slots 65 communicating with the sealing slots 63. The sealing slots 63 and 65 receive spline seal plates 61 for sealing the hot gas.

Working and effects of the shroud segment 35 according to the present embodiment will be described hereinafter.

The segment slot 53 is so dimensioned as to satisfy the inequality of $v < t \leq (v+0.1 \text{ mm})$, where v is the length of the case hook 51 and t is the width of the segment slot 53. Thereby the axial clearances between the case hook 51 and the segment slot 53 are prevented from being widened even when the back plate 37 becomes less curved caused by a large thermal stress. The hot gas flow to the main turbine case 5 via the rear end of the back plate 37 is effectively suppressed. Any additional members such as a C-clip are not necessary to suppress the hot gas flow.

The segment flange 45 is projected forward and disposed at the inner side of the segment hook 41, thereby the segment flange 45 effectively suppress the hot gas flow to the segment hook 41. Thermal displacement of the segment flange 45 caused by the hot gas is suppressed as well as the hot gas flow to the low-pressure turbine case 3 is suppressed. As mentioned above, the segment flange 45 and the segment hook 41 are configured so as to satisfy an inequality of $2k \leq s \leq 2.8k$, where k is a length of the segment hook 41 and s is a length of the segment flange 45. Thereby the hot gas flow to the segment hook 41 is effectively suppressed without providing an excessively long flange.

The shroud segment 35 of the present embodiment can effectively suppress influence of the hot gas flow on the low-pressure turbine case 3 though any additional members such as a C-clip are not necessary. Weight saving of the low-pressure turbine 1 can be obtained because such additional members are omitted.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A shroud segment for being incorporated in a gas turbine engine so as to suppress influence of hot combustion gas on a turbine case, the turbine case having a groove and a hook for engagement with the shroud segment, comprising:
    a back plate formed in an arc shape, a front end of the back plate being supported by the groove so as to allow displacement in an axial direction of the gas turbine engine;
    a slot circumferentially formed on an outer surface of the back plate, the slot being engaged with the hook so as to be immovable in the axial direction; and
    a touching member integrally formed on an inner surface of the back plate for touching with a rotating turbine blade;
    wherein the slot is so dimensioned as to satisfy an inequality of $v < t \leq (v + 0.1 \text{ mm})$ to retain tight contact with the hook without having a C-clip, where v is a length of the hook and t is a width of the slot.

2. The shroud segment of claim 1, further comprising:
    an annular segment hook integrally formed on the front end of the back plate and projected axially forward, the segment hook being slidably engaged with the groove.

3. The shroud segment of claim 2, further comprising:
    an annular segment flange projected axially forward from an arched flange extended radially inward from the front end of the back plate for supporting an outer band of a turbine nozzle disposed in front of and adjacent to the shroud segment.

4. The shroud segment of claim 3, wherein:
    the segment flange is configured so as to satisfy an inequality of $2k \text{ to } \leq s \leq \text{ to } 2.8k$, where k is a length of the segment hook and s is a length of the segment flange.

* * * * *